United States Patent [19]

Philipoussi

[11] Patent Number: 4,740,099
[45] Date of Patent: Apr. 26, 1988

[54] ASSEMBLY OBTAINED FROM METHOD OF TEMPORARY SOLDER ASSEMBLING OF RELEASABLE PLATES FOR MECHANICAL RELEASE DEVICE

[75] Inventor: Jean-Pierre Philipoussi, Mandelieu, France

[73] Assignee: Societe Nationale Industrielle Aerospatiale, Paris, France

[21] Appl. No.: 858,805

[22] Filed: May 2, 1986

Related U.S. Application Data

[62] Division of Ser. No. 669,521, Nov. 8, 1984, Pat. No. 4,607,780.

[30] Foreign Application Priority Data

Nov. 9, 1983 [FR] France ............................. 83 17800

[51] Int. Cl.⁴ ...................... F16B 5/08; B23K 29/00
[52] U.S. Cl. ............................... 403/2; 228/215; 228/118; 228/264; 228/191; 156/289; 156/247; 156/304.3; 403/272; 413/12
[58] Field of Search ............... 228/191, 212, 213, 215, 228/118, 264; 156/323, 304.3, 289, 291, 247; 29/DIG. 1; 403/2, 271, 272, 265; 413/12

[56] References Cited

U.S. PATENT DOCUMENTS

| | | | |
|---|---|---|---|
| 1,257,502 | 2/1918 | Leighton | 413/12 |
| 1,451,869 | 4/1923 | De Land | 228/118 |
| 1,954,840 | 4/1934 | Young | 228/118 |
| 2,047,686 | 7/1936 | Hodgson | 403/2 |
| 2,479,325 | 8/1949 | De Domenico | 228/212 |
| 3,339,008 | 8/1967 | MacArthur et al. | 29/829 |
| 3,747,197 | 7/1973 | Riel | 228/118 |
| 4,394,953 | 7/1983 | Sonnweber et al. | 228/124 |
| 4,426,053 | 1/1984 | Chenin et al. | 244/173 |
| 4,428,523 | 1/1984 | Snitzer et al. | 228/121 |
| 4,607,780 | 8/1986 | Philipoussi | 228/118 |

Primary Examiner—Nicholas P. Godici
Assistant Examiner—Samuel M. Heinrich
Attorney, Agent, or Firm—Browdy and Neimark

[57] ABSTRACT

A method is provided of temporary assembling by soldering of peel off plates through soldering material and a flexible junction element for a mechanical release device to release two parts temporarily fixed edgewise by peeling off the flexible element and the soldering material. There is provided on the plates and flexible junction element reserved areas without any adherence to the soldering material, and preferably at the limits of said reserved areas a recess for removing any excess of soldering material, and the melting solder material is put under load for distributing it between the plates and the flexible junction element. A so obtained assembly can be applied particularly to obtain automatic opening of containers in particular in space for spreading out solar panels.

7 Claims, 1 Drawing Sheet

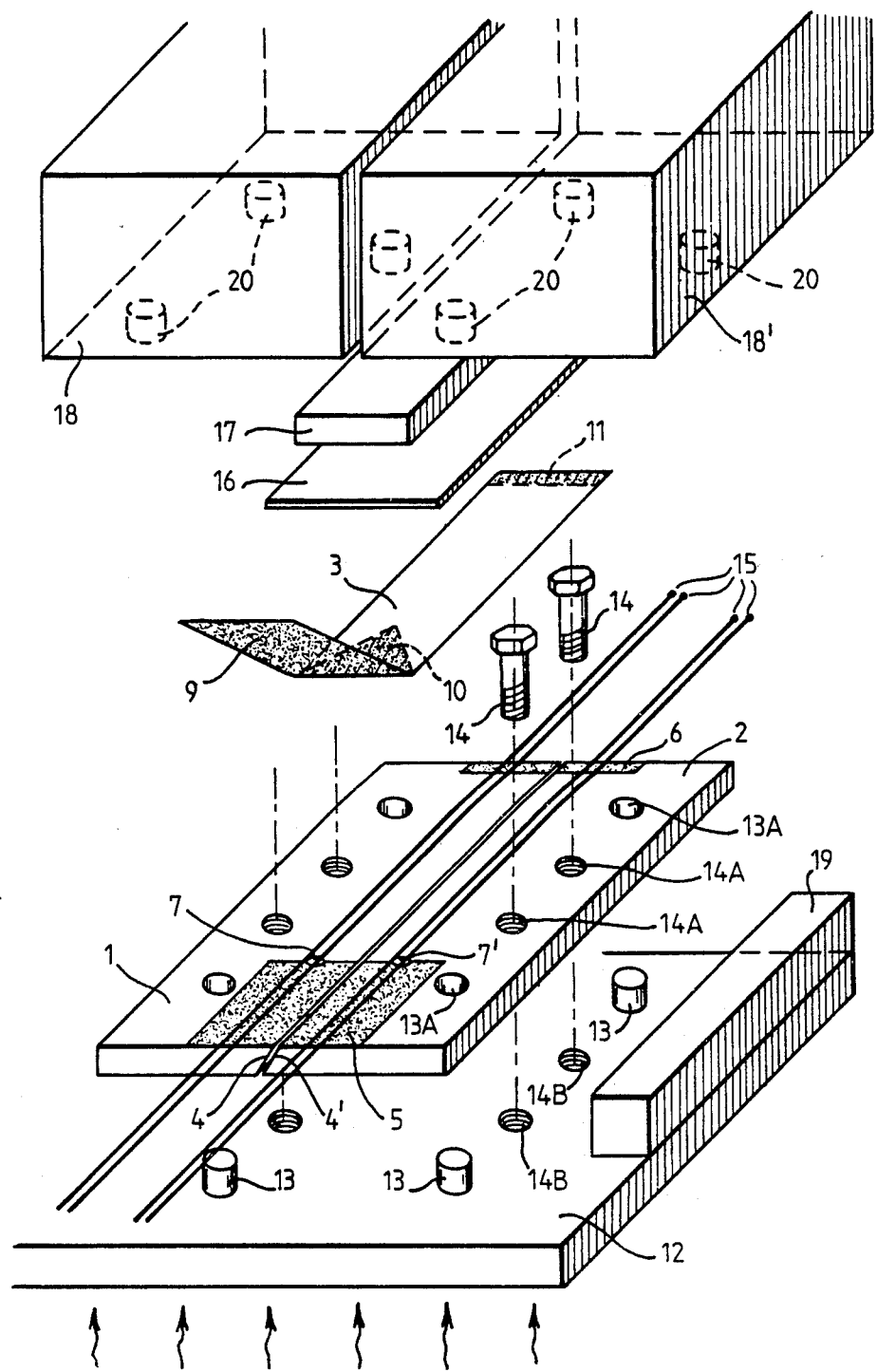

ASSEMBLY OBTAINED FROM METHOD OF TEMPORARY SOLDER ASSEMBLING OF RELEASABLE PLATES FOR MECHANICAL RELEASE DEVICE

This is a division of application Ser. No. 669,521 filed 11-8-84, now U.S. Pat. No. 4,607,780.

This invention relates to the preparation of a mechanical release device of the type described in particular in U.S. Pat. No. 4,426,053 granted on Jan. 17, 1984 in the Applicant's name and more particularly it relates to a method of temporarily assembling by soldering peel-off plates comprised by the mechanical release device, as well as to the so obtained assemblies.

U.S. Pat. No. 4,426,053 relates to the mechanical releasing of two elements temporarily fixed edgewise to one another, particularly under the severe vacuum and temperature conditions associated with space ambience. It relates in particular to the opening in space of containers comprising members such as solar panels which are to be spread out after bringing into orbit a carrier vehicle such as a satellite. It is proposed according to the invention, a mechanical release device for releasing two parts temporarily fixed edgewise to one another, which comprises a binding element disposed on each edge portion of said parts, a flexible junction member applied to said binding elements and a member to permit, under the action of a mechanism, automatic progressive lifting of said flexible element, with the arrangement of said elements being such that, on bringing into action said mechanism, the flexible member effects peeling off of the binding elements thereby causing complete release of the temporarily fixed parts as the flexible member is totally removed therefrom.

By way of illustration, FIG. 4 of U.S. Pat. No. 4,426,053 represents two walls arranged edgewise, to which there are respectively secured also edgewise two plates conjointly capped by a blade or flexible element which is added thereon by a binding element. In the example considered, it is a cable connected to the blade which provides for peeling off of the plates and therefore mechanical release of said walls.

Temporary securement of such walls is obtained by fixation onto the latter of previously formed assemblies of plates, binder and flexible element.

It is the temporary assembling through soldering of such assemblies which is the object of this invention.

Preparation of such assemblies (plates-solder-flexible element) requires particular care in the selection of the materials and their utilization for obtaining the necessary characteristics, in particular:

good transmission of the shearing stresses, which may occur at the junction of the walls in fixation configuration, which may reach 2000 N/cm; and a clear and easy release of the plates by tearing off the flexible element which is also called joint cover sheet metal under the effect of a traction force applied either onto the end of said flexible element or to a lifting means such as a roller or knife as proposed by U.S. Pat. No. 4,426,053, preferably, the tractive force is in the order of about 10 Newtons at most.

It will be understood that the mechanical characteristics of these assemblies must be sufficiently repetitive so as to be associable in series to be actuatable in one move. Similarly, it is necessary to obtain low dispersion in the efforts necessary to produce the peeling off in order to avoid overdimensioning of the control mechanism for the release device.

The object of this invention is therefore a method of manufacturing which is easily reproducible due in particular to appropriate control of the soldering capillarity problems when the solder is still in the liquid state.

To this end the invention proposes a method of temporarily assembling by soldering peelable plates through the intermediary of solder and a flexible junction element, said plates belonging to a mechanical releasing device to release two parts temporarily fixed edgewise to one another wherein such plates are adapted to be respectively brought side by side onto adjacent edges of said parts, the soldering material being disposed on the plates and the flexible junction element being applied to said soldering materials, and wherein there is provided an element for causing under the action of a mechanism automatic progressive lifting of said flexible element, the arrangement of these means being such that upon actuation of the mechanism, the flexible element provokes peeling off of the soldering material thereby causing complete release of the temporarily fixed parts as the flexible element is totally removed therefrom, the assembling method comprising the steps of:

providing on the plates and the flexible junction element reserved areas without any adhesiveness to the soldering material and intended for delimiting connection areas between said plates and said flexible element, providing in the plates recess means for collecting any excess of soldering material; and after interposition and then melting of the soldering material between the plates on the one hand, and the other hand, the flexible junction element, putting under load the soldering material to distribute it between the plates and the flexible junction element, however outside the reserved areas, with the recesses collecting any excess of soldering material.

This invention also relates to the so soldered assemblies of plates and flexible element which are adapted to temporarily fix two elements bound edgewise within the limits of a mechanical release device such as described in particular in U.S. Pat. No. 4,426,053.

Other objects, characteristics and advantages of this invention will appear from the following description given by way of non limitative example in reference to the attached drawing in which the single FIGURE is a perspective view of elements used for carrying out the method according to the invention.

The single FIGURE represents two plates 1 and 2 which are to be assembled temporarily edgewise one to the other through a flexible element or sheet metal 3 by means of a solder 15 uniformly distributed on the whole of the assembling area of said plates to said sheet metal.

Before assembling parts 1, 2 and 3 by soldering it is necessary to prepare their surface to obtain the desired adherence while avoiding bulges thereon producing irregular areas that may subsequently provoke substantial dispersion of the peeling force.

Parts 1, 2 and 3 are prepared as follows:

in a conventional manner, it is necessary to proceed with a surface treatment (removing grease, sanding) before each operation so that the soldering area presents reliable characteristics; then the contact areas with the solder are delimited by reserved areas (shown in gray) obtained by such a deposition as to inhibit solder adherence even in the hot condition. Such a deposition is for example based on a combination of zinc, nickel and molybdenum oxides, also called "nickel black", based on "DALIC" chromizing or other equivalent.

Said deposition is effected in particular on opposite edge portions 4 and 4' of the plates 1 and 2 and also opposite to the ends of the sheet metal (5 and 6). It is to be noted that the edge portions 4 and 4' of the plates are advantageously inclined. Each plate also comprises at least one recess means 7 and 7' for absorbing any excess of solder; in the example represented herein such recess means consist of a circular orifice astride on the limit of the reserved areas 5 located at the lifted side 9 of the sheet metal. Said orifice is not covered by "nickel black" so that capillarity of the solder makes it flow thereinto.

Preparation of the sheet metal 3 also comprises provision of reserved areas with nickel black i.e. one located on said lifted side 9 or peeling tongue is extended over a triangular zone 10 having its summit on the facing areas of the plates so as to subsequently facilitate the beginning of the peeling off; at the other end of the sheet metal a small strip 11 is neutralized so that no supplementary resistance will occur on completing the peeling path since in this manner the risk of formation of a soldering bulge is eliminated.

The soldering step is carried out by bringing beyond the melting temperature of the solder 15 an assembly consisting of:

both plates 1 and 2 prepared as specified above, fixed to a carrier 12 which determines their relative positions by means of positioning elements 13 and clamping screws 14; bores 13A and 14A are provided in the plates and said carrier comprises threaded holes 14B;

gauged soldering lengths 15 regularly distributed parallel to the centerline of the contacting plane of the plate edge portions, and the sheet metal 3 preformed and prepared as specified above.

Said elements 1, 2 and 3 form after melting of the solder 15 an assembly (plates-solder-sheet metal) ready for use to fix two walls (not represented).

The soldering step proper is carried out as follows:

the clamping carrier 12 of the plates is heated on its lower face, said carrier is covered on its top face with nickel black to prevent any risk of spurious soldering of the plates to the carrier;

a thermal insulation plate 16 is disposed onto the sheet metal;

a metallic plate 17 is placed over said plate for distributing loads between both edges of the sheet metal; and two weights 18 and 18' are disposed on said metallic plate so that each of the respective weights rests by half on one edge of the distribution plate.

When several assemblies of plates and sheet metal are manufactured simultaneously it is advantageous to mount them side by side thereby permitting each weight 18 or 18' to be carried on two adjacent halves of consecutive assemblies. These weights are advantageously provided with pawns 20, three in number in the represented example of embodiment (with two being on one side and one on the other) so as to define an identical polygonal base for each of the weights. A wedge 19 is used on the edge portion.

The purpose of such arrangements is to provide suitable distribution of the loads. As a matter of fact, if each weight would individually bear on a single assembly the individual balance between both sides would not be warranted just as easily and there would be the risk of unequal soldering thickness between both sides and therefore problems with the behaviour and peeling of the so formed assembly.

In this way, according to the invention the quantity of solder 15 is controlled by using gauged wires the number of which is selected so as to produce the required thickness. On the other hand, the soldering areas are limited by reserved areas 5, 6, 9 through 11 that have been submitted to a surface treatment to which the solder cannot adhere. Thereafter, a sufficient constant but low pressure is applied to the facing surfaces to obtain suitable distribution of the solder without however running the risk of pushing it off the previously delimited area, with clearances or traps 7, 7' permitting to remove any excess of solder. It is to be noted that the quality of the wire gauge 15 is not critical in view of the presence of traps 7 and 7'. It is sufficient to determine the number of such traps as a function of the accuracy of gauging of the wires used. Other forms of supply of solder can be provided.

Advantageously, an assembly (plates-solder-sheet metal) according to the invention is obtained as follows:
plates: cupro-beryllium;
sheet metal: tempered cupro-beryllium;
solder: Sn 62%—Pb 36%—Ag 2% (M.P. 178° C.)
heating temperature: 228° C.;
pressure on solder: 100 g/cm$^2$ It will be understood that the above description was only proposed by way of non limitative example of embodiment and that many variations can be proposed by the man of the art without however departing from the scope of the invention.

I claim:

1. A peelable assembly comprising:
    a pair of adjacent plates, each plate having two ends and two lateral edges, placed so that on lateral edge of one plate faces one lateral edge of the other plate, thus defining a junction between said facing lateral edges;
    a flexible element placed over said plates so as to cover said junction, said flexible element extending colinearly along said junction and being bound to said plates by a uniform layer of solder extending colinearly to said junction so as to releasably secure said adjacent plates together;
    a first reserved area without any adhesion to said solder, said first reserved area being provided on a top surface on one end of each said plate, beneath said flexible element; or on a bottom surface of one end of said flexible element so that said first reserved area covers a corresponding end of each said plate; and
    recesses in said plates at points corresponding to a border between said first reserved area of said surface having said first reserved area and the remaining area of said surface having said first reserved area;
    whereby, upon removal of said flexible element bound to said plates, said plates are completely released.

2. A peelable assembly according to claim 1 wherein said first reserved area is provided on a top surface at one end of each said plate, beneath said flexible element.

3. A peelable assembly according to claim 1 wherein said first reserved area is provided at said bottom surface of said one end of said flexible element.

4. A peelable assembly according to claim 1 wherein said first reserved area has a peeling initiation end and an opposite end, said peeling initiation end being shaped essentially as an isosceles triangle, portions of said plate or flexible element having said first reserved area which are outside of said isosceles triangle being soldered to said flexible element or plate, respectively, said other end of said first reserved area being essentially rectangular.

5. A peelable assembly according to claim 2 wherein a second reserved area to which solder does not adhere is provided on a bottom surface of one end of said flexible element, said second reserved area covering said first reserved area.

6. A peelable assembly according to claim 5, wherein said second reserved area has a peeling initiation end and an opposite end, said opposite end beginning at a portion of said flexible element corresponding to said one end of said plate and extending parallel to said junction up to an unreserved area of said plates, at which place is the base of said peeling initiation end, said peeling initiation end being essentially the shape of an isosceles triangle and covering a portion of said unreserved area of said plates.

7. A peelable assembly according to claim 4, wherein an end of said plates or said flexible element opposite said end corresponding to said first reserved area has a third reserved area to which no solder can adhere.

* * * * *